United States Patent Office 3,449,228
Patented June 10, 1969

3,449,228
AQUEOUS COMPOSITIONS ADAPTED FOR ELECTRODEPOSITION
Michael Yurcheshen, Parma Heights, Morris Levine, Cleveland Heights, and Ralph M. Brane, Avon Lake, Ohio, assignors to PPG Industries, Inc., Pittsburgh, Pa., a corporation of Pennsylvania
No Drawing. Filed Apr. 1, 1965, Ser. No. 444,852
Int. Cl. C23b 13/00
U.S. Cl. 204—181                                                 4 Claims

ABSTRACT OF THE DISCLOSURE

Ungelled thermosetting reaction products of an amine-aldehyde condensation product and a phenol or polyol produced in the presence of an acid provide vehicles for water-dispersed compositions that are applied by electrodeposition. Preferably, the reaction product is employed in combination with the polycarboxylic acid resin. Adherent films are obtained which cure to provide hard, durable coatings on metals and other conductive surfaces.

---

This invention relates to modified amine-aldehyde condensation products suitable for use in electrodeposition processes and for other purposes, and to electrodeposition of coating compositions containing such modified products.

Electrodeposition, although known for some time, has only recently become of commercial importance as a coating application method. The increased use of such methods has been due to the development of certain compositions which provide highly satisfactory coatings when applied in this manner. While many compositions can be electrodeposited, most coating compositions when applied using electrodeposition techniques do not produce commercially usable coatings. Moreover, electrodeposition of many coating materials, even when otherwise successful, is often attended by various disadvantages such as non-uniform coatings and by poor throwing power. By "throwing power" is meant that property whereby areas of the electrode being coated at varying distances from the other electrode receive substantially the same density of the product.

As indicated above, various coating compositions can be applied by electrodeposition techniques. The coatings achieved, however, have in most instances been deficient in certain properties essential for their utilization in many applications for which electrodeposition is otherwise suited, for example, corrosion resistance, hardness, alkali resistance, and similar characteristics necessary for coatings. Such properties are difficult to achieve, especially with water-dispersed resins such as are employed in electrodeposition processes.

It has now been found that certain reaction products of an amine-aldehyde condensate and a hydroxy compound provide highly advantageous results and coatings that can be successfully applied by electrodeposition. These coreaction products can be themselves the prime or sole film-forming constituent of coating compositions or, as is more usually the case, they can be included in such a composition along with another coating material. When employed with another film-forming component, these products impart highly desirable properties, including those ordinarily associated with the inclusion of amine-aldehyde resins in coatings, and, in addition, provide unique advantages and properties to the coated products.

The coreaction products of the invention are ungelled, thermosetting products made by reacting an amine-aldehyde condensation product with a phenol or a polyol in the presence of an acid catalyst. While it is clear that a reaction takes place to combine the phenol or polyol and the amine-aldehyde condensate, the exact nature of the reaction and the structure of the product appear to be complex and are not known with certainty. Also, the presence of an acid is required, and while it is considered a catalyst, it may be that the acid also reacts with the other components, at least to some extent. Thus, the term "acid catalyst" as utilized herein refers to an acid which may or may not be a catalyst in the classical sense, i.e., recoverable unchanged, but is used in the sense of being a promoter of the desired reaction and effective in small amounts.

The amine-aldehyde product employed can be any of the aldehyde condensation products of melamine, urea, benzoguanamine, or similar compounds; it may be water soluble or organic-solvent soluble. Condensation products of melamine or urea are the most common and are preferred, but such products of other amines and amides in which at least one amino group is present can also be employed. For example, such condensation products can be produced from triazines, diazines, triazoles, guanadines and guanamines, and alkyl-substituted, aryl-substituted, and other derivatives of such compounds, such as alkyl-substituted, aryl-substituted, and cyclic ureas and alkyl-substituted and aryl-substituted melamines.

Some examples of such compounds are

N,N'-dimethyl urea,
benzyl urea,
dicyanadiamide,
formoguanamine,
acetoguanamine,
ammeline,
N,N'-ethylene urea,
diazine diamide,
2-chloro-4,6-diamino-1,3,5-triazine,
2-phenyl-4-amino-6-hydroxyl-1,3,5-triazine,
3,5-diaminotriazole,
triamino-pyrimidine,
2-mercapto-4,6-diamino-pyrimidine,
2,4,6-trihydrazine-1,3,5-triazine,
2,4,6-triethyltriamino-1,3,5-triazine,
2,4,6-triphenyltriamino-1,3,5-triazine, and the like. For certain purposes, reaction products made from condensates of urea are less desirable than, for example, those of melamine; this is often true, for instance, where the coating is required to have resistance to alkaline atmospheres. However, while urea derivatives have relatively poor alkali resistance, they are in many cases superior in salt-spray resistance.

The aldehyde employed is usually formaldehyde, although similar condensation products can be made from other aldehydes such as acetaldehyde, crotonaldehyde, acrolein, benzaldehyde, furfural, and others.

These aldehyde condensation products contain methylol or similar alkylol groups, the structure of the alkylol group depending upon the particular aldehyde employed. All or part of these alkylol groups may be etherified by reaction with an alcohol if desired. Among the preferred amine-aldehyde products for use in the present invention are those which are substantially alkylated by an etherification reaction, i.e., in which at least a major portion of the alkylol groups have been reacted with an alcohol. Essentially any monohydric alcohol can be employed for this purpose, including such alcohols as methanol, propanol, butanol, heptanol and other alkanols having up to about 12 carbon atoms or more, as well as benzyl alcohol and other aromatic alcohols; cyclic alcohols, such as cyclohexanol; monoethers of glycols, such as the Cellosolves and Carbitols; and halogen-substituted or other substituted alcohols, such as 3-chloro-propanol. The preferred alcohols are methanol, butanol, and similar lower alkanols.

The amine-aldehyde condensation products are produced in a manner well known in the art, using acidic or basic catalysts and varying conditions of time and temperature. The aldehyde is often employed as a solution in water or alcohol, and the condensation, polymerization and etherification reactions may be carried out either sequentially or simultaneously.

Essentially any phenol or polyol can be reacted with the foregoing amine-aldehyde condensate in accordance with the invention. Monohydric phenols, such as phenol, cresol and the like, can be used, but preferred are polyhydroxy hydrocarbons, and especially aromatic hydrocarbons containing at least one hydroxyl group attached directly to a ring carbon, i.e., polyhydric phenols. Some of these preferred polyhydric phenols are:

2,2-bis(4-hydroxyphenyl)propane
4,4'-dihydroxybenzophenone
1,1-bis(4-hydroxyphenyl)ethane
2,2-bis(4-hydroxyphenyl)butane
2,2-bis(4-hydroxy-tertiary butyl phenyl)propane
Bis(2-hydroxynaphthyl)methane
Catechol
Resorcinol
2,5-dimethylresorcinol
o,o'-Biphenol
1,1'-bi-2-naphthol
2,4-dihydroxytoluene
Hydroquinone
1,2-benzenediol The polyols which can be used include the various non-phenolic polyhydroxy compounds, and may be aliphatic, aromatic, cyclic or substituted with halogens, amino groups, or the like. Examples are such compounds as ethylene glycol, propylene glycol, butylene glycol, neopentyl glycol, trimethylolethane, trimethylolpropane, xylylene glycol, pentaerythritol, 2,2-bis(4-hydroxycyclohexyl)propane, 2-chloro-2,4-pentanediol, diethanolamine, and glycerol. There may also be utilized long chain and resinous polyols, such as polyether and polyester polyols from the reaction of alkylene oxides with polyols or polycarboxylic acids, reaction products of styrene with allyl alcohol, and similar products.

The reaction between the amine-aldehyde condensation product and the phenol or polyol is carried out in the presence of an acid catalyst, which can be virtually any acid, strong or weak. Mineral acids, carboxylic acids and sulfonic acids all can be employed. Among these acids are sulfuric acid, hydrochloric acid, phosphoric acid, hypobromous acid, benzoic acid, acetic acid, propionic acid, 2-ethylhexoic acid, stearic acid, maleic acid, phthalic acid, 1,2-cyclopentane dicarboxylic acid, dimethylolpropionic acid, benzenesulfonic acid, methanesulfonic acid, p-toluenesulfonic acid, 1-naphthylaminesulfonic acid, 1,5-naphthalenedisulfonic acid, methionic acid, benzenephosphonic acid, and others. It is essentially the acidic medium provided by the presence of an acid which is desired, rather than any particular acid or type of acid. For reasons of economy and convenience, as well as effectiveness, p-toluenesulfonic acid is most often utilized. Anhydrides of those acids which form anhydrides can usually be employed in place of the acid.

The amount of acid employed is not critical, and relatively high amounts can be present; however, catalytic quantities, i.e., small, effective amounts, are preferred. The optimum amount employed in any particular reaction system depends on several factors, including the type of acid and its acid strength, molecular weight, and the like, and the nature and amounts of the other components of the reaction system. Generally speaking, at least about one percent of acid (based on the total weight of reactants) is present for best results and economical operation. The preferred range of acid catalyst is from about 0.5 percent to about 5 percent, although higher or lower amounts can be used.

In reacting the amine-aldehyde condensate and the phenol or polyol to produce the coreaction products of the invention, the conditions of the reaction are ordinarily not critical. In most instances, heating to temperatures between about 125° F. and about 400° F. is employed. A solvent may be included initially, but usually solvent is not added until after the reaction. Various ordinary solvents, including alcohols, hydrocarbons, etc. can be used; if the product is to be employed in a water-dispersed composition, a water-soluble solvent is preferred. Any water or alcohol evolved during the reaction may be removed if desired, or allowed to remain in the reaction mixture.

The proportion of the amine-aldehyde condensate in the reaction product can be varied widely. Based on the total of the condensate and the hydroxy compound, the condensate can comprise from about 20 percent to about 80 percent by weight of the product, with about 40 percent to about 60 percent being preferred.

In addition to the amine-aldehyde condensate, the alcohol and the acid catalyst, the reaction product can include other components; most often employed are epoxides such as reaction products of epichlorohydrin and bisphenol A, and other modifying resins. These can be included in the reaction mixture initially or added at any stage of the process.

The coreaction products thus produced can be employed as the film-forming component in coating compositions along with pigments, fillers, additives, solvents and the like, and these can be applied by electrodeposition or by other means. It is usually preferred, however, to employ these reaction products in conjunction with another film-forming material.

Essentially any film-forming material can be combined with the coreaction product, with the chief consideration being compatibility in the desired proportions; when the composition is to be electrodeposited, any electrodepositable material can be employed. The addition of the coreaction products described herein improves the properties of any such material. Polycarboxylic acid resins are most often employed in electrodeposition processes and the reaction products herein are especially suited to inclusion in compositions comprising such polycarboxylic acid resins. A particular advantage of these reaction products in such compositions is that the reaction product is codeposited along with the polycarboxylic acid resin to a much higher degree than is the case with the amine-aldehyde condensates themselves.

The polycarboxylic acid resins include those materials which contain a plurality of carboxyl groups within the resin molecule. These include, for example, copolymers of an acrylic acid with one or more acrylates of methacrylates, and more preferably, alkyd resins and reaction products of fatty acid esters with unsaturated dicarboxylic acids or anhydrides, e.g., the so-called "maleinized oils," which are reaction products of a siccativ oil and maleic anhydride.

The alkyd resins employed in such compositions can be any of the saturated or unsaturated alkyds utilized in the coatings field, produced from any polybasic acid and polyfunctional alcohol. For example, the alkyd may be made from such polyfunctional acids as phthalic acid, maleic acid, fumaric acid, isophthalic acid, succinic acid, adipic acid, azelaic acid, fatty acids and the like, as well as anhydrides of such acids. Among the polyols employed are glycerol, trimetholethane, trimetholpropane, pentaerythritol, sorbitol, mannitol, ethylene glycol, diethylene glycol, 2,3-butylene glycol, and similar alcohols. The alkyd resin may be oil-modified or non oil-modified, can contain in part a monobasic acid such as benzoic acid, and can be copolymerized with one or more other ethylenically unsaturated monomers. Such monomers include ethyl acrylate, methyl methacrylate and other esters of acrylic acid and methacrylic acid, acrylonitrile, olefinic hydrocarbons, and other polymerizable monomers, preferably containing a CH$_2$=C< group.

For use in electrodeposition, water-dispersible alkyds are preferred, such as those in which a glyceryl phthalate resin or other conventional alkyd, which may be modified with drying oil fatty acids, is made with a high acid number, or those in which a surface active agent such as a polyalkylene glycol (e.g., "Carbowax") is incorporated. High acid number alkyds are also made by employing a tricarboxylic acid such as trimellitic acid or anhydride.

Another type of coating composition in which these coreaction products provide beneficial results are those in which the vehicle comprises a reaction product of a drying oil fatty acid ester with an alpha, beta-ethylenically unsaturated dicarboxylic acid or an anhydride of such an acid. The composition may also comprise the reaction product of the ester, acid or anhydride and one or more other ethylenically unsaturated monomers. Part of the carboxylic groups from the acid or anhydride can be esterified by reaction with an alcohol if so desired.

The fatty acid esters used to make the aforesaid vehicles are esters of fatty acids which are or can be derived from drying oils or from such sources as tall oil. (By "drying oil" is meant those oils having an iodine number of greater than about 90, thus including so-called "semi-drying oils.") Examples of such esters include linseed oil, safflower oil, perilla oil, tung oil, oiticica oil, sunflower oil, tall oil esters, dehydrated castor oil, fish oils, and the like.

The fatty acid ester may also be an alkyd resin prepared utilizing a semi-drying or drying oil; an ester of an epoxide with such fatty acids; or a semi-drying or drying oil fatty acid ester of a monomeric or resinous polyol. If desired, the ester may be modified with other acids, such as saturated, unsaturated or aromatic acids, as well as with such acid materials as rosin.

The alpha, beta-ethylenically unsaturated dicarboxylic acid or anhydride may be an anhydride such as maleic anhydride or itaconic anhydride, or an unsaturated dicarboxylic acid which forms an anhydride, for example, maleic acid or itaconic acid. The acids appear to function by first forming an anhydride. Fumaric acid, which does not form an anhydride, may also be employed, as can mixtures of any of the above acids or anhydrides. Usually the anhydride or acid employed contains from 4 to 12 carbon atoms. The reaction between the acid or anhydride and the fatty acid ester takes place readily without the use of a catalyst at temperatures between about 100° C. and about 300° C., depending primarily upon the type of fatty acid ester used.

As indicated, the ester-acid or anhydride product can also include one or more other ethylenically unsaturated monomers in polymerized form. Essentially, any ethylenically unsaturated monomer, e.g., those containing CH$_2$=C< groups, can be employed for this purpose, with the preferred compounds being styrene, substituted styrenes, alkyl acrylates, alkyl methacrylates, diolefins and acrylonitrile. Although the proportions of the components in the foregoing fatty acid ester-acid or anhydride reaction products are not critical, it is preferred to utilize between about 10 and about 45 percent by weight of the unsaturated acid or acid anhydride with about 55 percent to about 90 percent by weight of fatty acid ester. If an ethylenically unsaturated monomer is incorporated in the reaction product, it is typically used in amounts between about 5 percent and about 35 percent by weight based upon the total weight of acid or anhydride and ester.

The proportions of coreaction product in the composition when a blend of materials is used can be widely varied. Essentially, any appreciable amount of coreaction product in conjunction with the other materials improves the properties thereof.

As little as 5 percent by weight or even less has an appreciable effect. Since the coreaction product can be utilized alone, there is no upper limit on the amount that can be included in a mixture, although compatibility should be considered. It is not always necessary that the components be completely compatible, but it is desirable that the mixture be reasonably stable on standing. In most instances in which a blend is utilized in an electrodeposition process, the amount of coreaction product is between about 10 percent and 80 percent by weight of the total film-forming components.

When the compositions herein are to be employed for electrodeposition, they are made water-dispersible by neutralizing all or part of the carboxyl groups by reaction with a base. The neutralization reaction is accomplished by mixing the neutralizing base with the carboxyl-containing components, usually in the presence of water. If desired, moderately elevated temperatures can be used. The extent of neutralization can be varied, and in practice is generally based upon the pH of the resulting dispersed composition. It is usually preferable that the pH be under about 10, but this depends upon the particular components. In most instances, the pH is at least about 7.5.

Inorganic bases, such as metal hydroxides or, more desirably, ammonia, can be used for the neutralization, as can organic bases, particularly amines. Among the preferred class of neutralizing bases are ammonia and any basic amine, including alkyl amines, cycloalkyl amines, unsaturated amines, aromatic amines, aryl amines, aralkyl amines, cyclic amines, diamines and substituted amines, of the primary, secondary, tertiary or quaternary amine types.

It is preferred in certain instances that the neutralization reaction be carried out in such a manner that amido groups are attached to part of the carbonyl carbon atoms derived from the dicarboxylic acid or anhydride. By amido groups are meant trivalent nitrogen atoms attached with one valence to the carbonyl carbon atom, with the other two valences being linked to hydrogen or carbon atoms in the same or different organic radicals. Amido groups are formed, for example, when the reaction with the neutralizing base is carried out with a water solution of ammonia, a primary amine or a secondary amine, or when the product is reacted with such an amine in the absence of water.

The electrodepositable coating compositions comprising the above reaction products contain in most instances a pigment composition and, if desired, various additives such as anti-oxidants, surface active agents and the like. The pigment composition may be of any conventional type, comprising, for example, iron oxides, lead oxides, strontium chromate, carbon black, titanium dioxide, talc, barium sulfate, as well as color pigments such as cadmium yellow, cadmium red, chromic yellow and the like. Better results with pigmented compositions are attained if the weight ratio of pigment solids to vehicle solids is not higher than about 1.5 to 1, and preferably not higher than about 1 to 1. The coating compositions when employed for electrodeposition usually are made up of at least about 80 percent water.

In formulating the coating composition, ordinary tap water may usually be employed, but if such water contains a relatively high level of cations, it is desirable to employ distilled water or deionized water from which free ions have been removed, as by passage through an ion exchange resin.

The compositions including the coreaction products as described herein can be applied in any conventional manner, such as brushing, spraying, or roll coating. However, because these compositions are especially adapted for use in electrodeposition, and because coatings of the excellent characteristics attained by those herein are difficult to achieve by electrodeposition, emphasis is placed upon the utility of these materials in such processes.

In electrodeposition coating processes employing the various coating compositions described above, the surface to be coated is employed as one of the electrodes. In the specific types of compositions described above, the surface to be coated is employed as the anode and is in contact with the bath containing the coating composition. Upon the passage of electric current through the bath between the anode and the cathode, an adherent film of the coating composition is deposited. The conditions under which the electrodeposition step herein is carried out are those conventionally used in electrodeposition of coatings. The applied voltage may be varied greatly and can be, for example, as low as 1 volt or as high as several thousand volts, although typically between 50 volts and 500 volts. The current density is usually between about 0.1 ampere and about 15 amperes per square foot, and tends to decrease during the electrodeposition.

The concentration of the non-volatile components (i.e., vehicle and any pigments and the like) in the aqueous bath is not critical and relatively high levels can be employed. However, it is ordinarily desirable to use as low a concentration as gives satisfactory results, and in the cases of the above-described compositions, aqueous compositions containing as little as 1 percent by weight of non-volatile solids can be employed, with those containing between about 5 percent and about 40 percent by weight being preferred.

Any conductive surface can be coated by the electrodeposition method described. Electrically conductive material surfaces such as iron, steel, aluminum, zinc and the like are most often utilized, but other conductive surfaces such as those in which a conductive material or coating is superimposed upon a non-conductive substrate can also be coated in this manner.

After deposition of the coating upon the surface, the coating is cured, generally by heating to elevated temperatures, with the temperature and time of heating being correlated to provide the desired degree of curing. For ordinary purposes, curing schedules of from 250° F. to 500° F. for 1 to 30 minutes are employed.

Set forth below are several specific examples of the invention. These examples, being illustrative, are not to be construed as limiting. All parts and percentages are by weight unless otherwise specified.

Example 1

There were mixed 720 parts of hexakis(methoxymethyl)melamine, 480 parts of 2,2-bis(4-hydroxyphenyl)-propane, and 6 parts of p-toluene sulfonic acid. The mixture was heated with stirring to 150° F. and maintained at this temperature for 3 hours. There were then added 300 parts of 4-methoxy-4-methylpentanone-2. The product had a solids content of 80 percent, Gardner-Holdt viscosity of T, and an acid number of 6.

Example 2

Following the procedure of Example 1, a reaction product was produced from 600 parts of hexakis (methoxymethyl)melamine and 333 parts of 2,2-bis(4-hydroxyphenyl)-propane, in the presence of 67 parts of 2-ethylhexoic acid. Sufficient 4-methoxy-4-methylpentanone-2 was added to make the total solids content 80 percent. The product had an acid number of 25.

Example 3

Example 1 was repeated using 700 parts of hexakis-(methoxymethyl)melamine, 200 parts of 2,2-bis(4-hydroxyphenyl)propane, and 100 parts of succinic anhydride. The product had an acid number of 48 and its Gardner-Holdt viscosity was 0.

Examples 4–7

The procedure of the foregoing examples was employed to produce reaction products from the reaction of hexakis(methoxymethyl)melamine with various hydroxy compounds, in the presence of 8 parts of p-toluene sulfonic acid. In each case, after the reaction, 4-methoxy-4-methylpentanone-2 was added in an amount sufficient to give a total solids content of 80 percent. The data are given in Table I.

TABLE I.—EXAMPLES 4 TO 7

| Example | Alcohol | Parts of condensate | Parts of alcohol | Product Viscosity | Acid No. |
|---|---|---|---|---|---|
| 4 | p(1,1-Dimethylpropyl)phenol | 600 | 400 | G | 4 |
| 5 | Polyether polyol [1] | 600 | 400 | C | 2 |
| 6 | Resorcinol | 800 | 200 | K | 8 |
| 7 | o,o'-Biphenol | 800 | 200 | E | 39 |

[1] Reaction product of propylene oxide and 1,2,6-hexanetriol having a hydroxyl number of 240.

As indicated hereinabove, the reaction products produced in accordance with the foregoing examples can be utilized in various ways. The reaction product can be used as the sole or primary film-forming component in coating compositions used to provide protective films and coatings. For example, a hard, thermoset film was produced when a metal such as steel, or other substrate, was coated with these products and cured, a representative curing time being 30 minutes at 300° F. However, these products are ordinarily employed in conjunction with another film-forming material and they are most desirable when employed as a component in electrodepositable compositions wherein they are preferably blended with one or more polycarboxylic acid resins. The examples below illustrate this embodiment of the invention.

In the examples, several polycarboxylic acid resins are employed. That designated as Polycarboxylic Acid Resin A is an alkyd resin produced by heating a mixture of 1155 parts of 2,2-bis(4-hydroxyclohexyl)propane, 896 parts of soybean fatty acid, and 504 parts of 1,5-pentanediol. During the heating there were added 896 parts of trimellitic anhydride, and this mixture was heated at 350° F. to 360° F. until it had an acid number of about 50. After cooling to 120° F., there were added 1071 parts of 4-methoxy-4-methyl-pentanone-2 and 19.4 parts of 1,2-propylene imine, and the mixture was then heated to 170° F. for one-half hour. The product had a solids content of 75 percent.

Polycarboxylic Acid Resin B was made by heating a 4 to 1 weight mixture of linseed oil and maleic anhydride to 250° C. over a two hour period and then holding the mixture at this temperature for 15 minutes.

Examples 8 to 16

Coating compositions were made by blending Polycarboxylic Acid Resin A or Polycarboxylic Acid Resin B with one of the reaction products of the above examples and then adding sufficient triethylamine and deionized water to give a dispersion with a total solids content of 40 percent and a pH of about 8. The compositions were pigmented by grinding iron oxide with the above vehicle at a pigment-to-vehicle solids ratio of .66 to 1. To this was added sufficient deionized water to give a composition having a total solids content of 8 percent and a pH of about 8.5.

Each composition thus produced was electrodeposited on both plain and phosphatized steel panels by employing the panels to be coated as the anode, with another similar panel as the cathode. Both electrodes were immersed in the coating composition, which was maintained at about 80 to 85° F., and 120 to 140 volts were applied between the electrodes for 60 seconds. The panel in each case was then rinsed with water and baked for 45 minutes at 325°

F. The various compositions employed in these examples are shown in Table II.

TABLE II.—EXAMPLES 8-16

| Example | Reaction product | | Polycarboxylic acid resin | |
|---|---|---|---|---|
| | Example | Parts | Resin | Parts |
| 8 | 1 | 100 | A | 150 |
| 9 | 1 | 100 | B | 112 |
| 10 | 2 | 100 | A | 150 |
| 11 | 3 | 100 | A | 192 |
| 11 | 3 | 100 | A | 192 |
| 12 | 4 | 100 | A | 150 |
| 13 | 5 | 100 | A | 150 |
| 14 | 6 | 100 | A | 235 |
| 15 | 6 | 100 | B | 176 |
| 16 | 7 | 100 | A | 235 |

In each of the above examples ther was obtained a smooth, adherent film with a hardness sufficient to permit sanding, and other desirable properties. For example, the films generally had excellent alkali resistance, as shown by a test in which the film in each instance was scored and immersed for 6 days in 0.1 normal sodium hydroxide solution at 100° F. with no visible effects.

Similar results were attained using various other reaction products and coating compositions. For example, other electrodepositable film-forming materials can be employed in conjunction with the reaction products, including polyesters, acrylic resins and the like; and reaction products made from other amine-aldehyde condensates can be used, such as tetrakis(methoxymethyl)-benzoguanamine or butylated urea-formaldehyde resins, e.g., one made from one mole of urea, 2.2 moles of formaldehyde and 1.6 mole of butanol. Also, different acid catalysts can be used, and the coating compositions used for electrodeposition can be made with other solubilizing agents, pigments, additives, etc. While specific properties obtained may vary in these cases, films desirable for many purposes are provided.

According to the provisions of the patent statutes, there are described above the invention and what are now considered to be its best embodiments. However, within the scope of the appended claims, it is to be understood that the invention can be practiced otherwise than as specifically described.

We claim:
1. A method of coating an electrically conductive surface which comprises passing electric current between an electrically conductive anode and an electrically conductive cathode in contact with a water-dispersed coating composition comprising an at least partially neutralized vehicle which consists essentially of
   (a) an ungelled thermosetting reaction product of an amine-aldehyde condensation product and a hydroxy compound selected from the group consisting of phenols and polyols, said reaction product having been produced in the presence of an acid catalyst; and
   (b) at least one other electrodepositable film-forming resin selected from the group consisting of alkyd resins and reaction products of a drying oil fatty acid ester and at least one acidic compound selected from the group consisting of anhhydides of alpha, beta-ethylenically unsaturated dicarboxylic acids, alpha, beta-ethylenically unsaturated dicarboxylic acids which form anhydrides, fumaric acid, and mixtures thereof;
whereby an adherent coating of said composition is deposited on the anode.

2. The method of claim 1 in which said polycarboxylic acid resin is an alkyd resin.

3. The method of claim 1 in which said polycarboxylic acid resin is a reaction product of a drying oil fatty acid ester and at least one acidic compound selected from the group consisting of anhydrides of alpha, beta-ethylenically unsaturated dicarboxylic acid, alpha, beta-ethylenically unsaturated dicarboxylic acids which form anhydrides, fumaric acid and mixtures thereof.

4. An article comprising a surface having thereon a cured adherent film produced by the method of claim 1.

References Cited

UNITED STATES PATENTS

| 1,633,337 | 6/1927 | Lauter | 260—70 |
| 2,009,173 | 7/1935 | Gams et al. | 260—51.5 |
| 2,111,622 | 3/1938 | Goepp | 260—70 |
| 2,329,651 | 9/1943 | Powers et al. | 260—70 |
| 2,345,543 | 3/1944 | Wohnsiedler et al. | 204—181 |
| 2,358,276 | 9/1944 | Hodgins et al. | 260—67.6 |
| 2,500,054 | 3/1950 | Anthony et al. | 260—51.5 |
| 2,648,642 | 8/1953 | Spencer | 260—70 |
| 2,680,734 | 6/1954 | Dearing | 260—70 |
| 2,688,607 | 9/1954 | Suen | 260—70 |
| 2,785,149 | 3/1957 | Wohnsiedler | 260—51.5 |
| 3,036,028 | 5/1962 | Malashevitz | 260—51.5 |
| 3,238,160 | 3/1966 | Hensen | 260—67.6 |
| 3,364,162 | 1/1968 | Huggard | 260—22 |

OTHER REFERENCES

Industrial and Engineering Chemistry, Gemant, vol. 31, October 1939, pp. 1233–1236.

DONALD E. CZAJA, *Primary Examiner.*

R. W. GRIFFIN, *Assistant Examiner.*

U.S. Cl. X.R.

117—132, 134, 161, 167; 260—21, 22, 23, 29.4, 32.4, 32.6, 33.2, 39, 40, 51.5, 67.6, 70, 834, 850, 851, 855, 862